(No Model.)

J. W. CABOT.
VALVE.

No. 490,945. Patented Jan. 31, 1893.

WITNESSES:

INVENTOR:
J. W. Cabot
BY Munn & Co
ATTORNEYS.

UNITED STATES PATENT OFFICE.

JOHN W. CABOT, OF BOSTON, MASSACHUSETTS.

VALVE.

SPECIFICATION forming part of Letters Patent No. 490,945, dated January 31, 1893.

Application filed March 21, 1892. Serial No. 425,855. (No model.)

*To all whom it may concern:*

Be it known that I, JOHN W. CABOT, of Boston, in the county of Suffolk and State of Massachusetts, have invented a new and Improved Valve, of which the following is a full, clear, and exact description.

The invention relates to valves for hydraulic and other machinery; and its object is to provide a new and improved valve which is simple and durable in construction, very effective in operation, and arranged to automatically take up all wear and to prevent leakage.

The invention consists of certain parts and details and combinations of the same, as will be fully described hereinafter and then pointed out in the claims.

Reference is to be had to the accompanying drawings forming a part of this specification, in which similar letters of reference indicate corresponding parts in all the figures.

Figure 1:
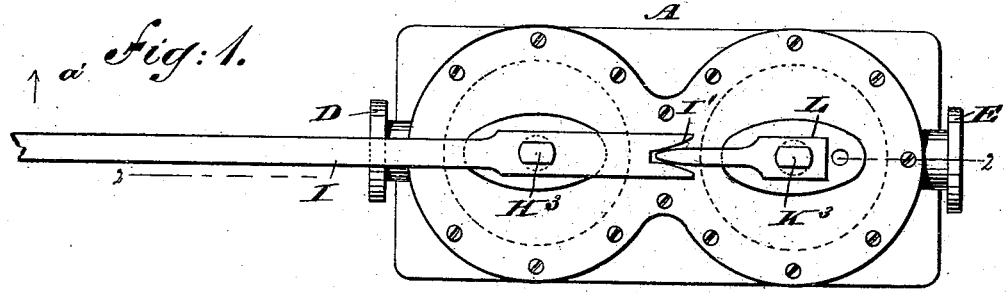
Figure 2:
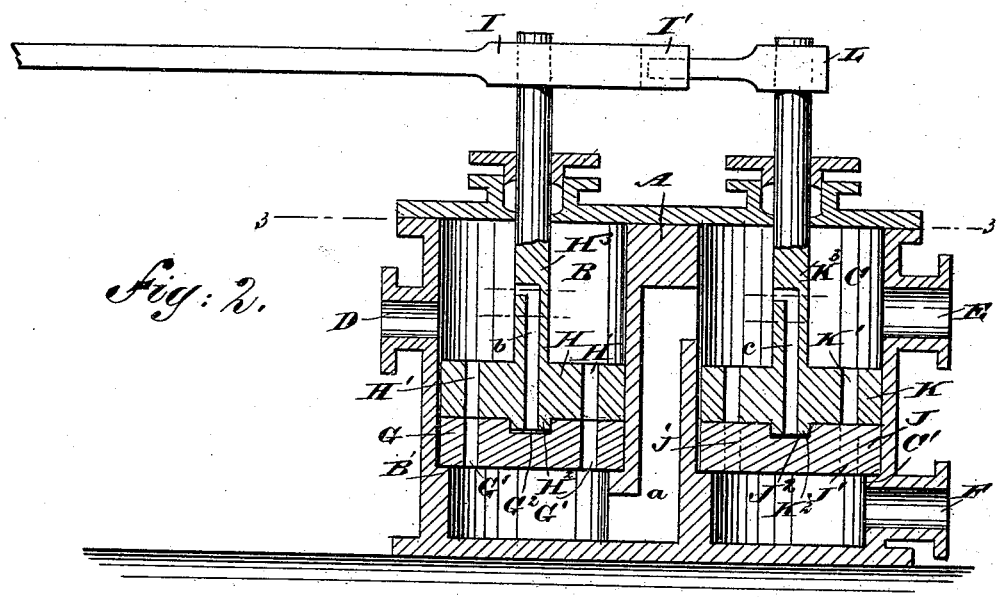
Figure 3:
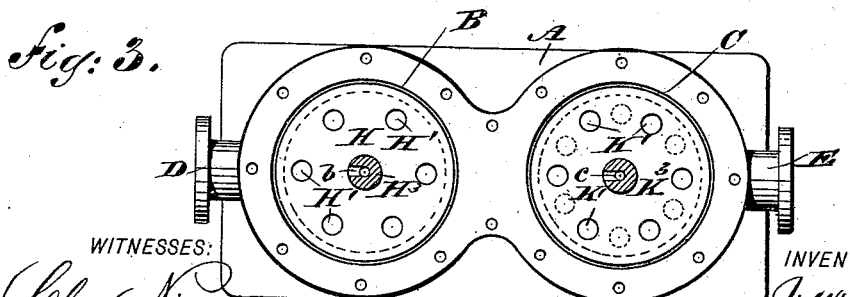

Figure 1 is a plan view of the improvement; Fig. 2 is a sectional side elevation of the same on the line 2—2 of Fig. 1; and Fig. 3 is a sectional plan view of the same on the line 3—3 of Fig. 2.

In ordinary practice, especially with reference to hydraulic cranes, the difficulty with the ordinary valves used is found in the fact that as soon as their moving parts become at all worn, the valve leaks, pressure water is wasted, and the crane or other machine cannot be held steadily in any one desired position without being constantly watched. A large expense is necessarily entailed in keeping such valves in repair, as the valve faces must be turned or trued up or faced off, and the valve chambers bored out as often as they become worn. This work requires the services of skilled machinists. In order to work at all such valves are provided with either leather, gutta percha, or some soft packing rings or cups which require constant renewal, and are thus a source of further expense as well as injury to the machinery on account of the liability of the hydraulic pipes becoming stopped up or clogged with pieces of the soft material worn off in the operation of the valve. In the valve presently to be described all the above mentioned difficulties are completely overcome.

The body A of the valve is provided with the two cylinders B and C, of which the cylinder B is provided near its upper end with an inlet D connected with a suitable source of supply, and the other cylinder C is provided with an outlet E connected with the machinery to be operated, and also with an exhaust F arranged near the bottom of the said cylinder. The lower end of the cylinder B is connected with the upper end of the cylinder C by means of a channel $a$.

In the cylinder B, near its lower end, is formed a circular offset B' on which is seated the valve seat G formed with vertical apertures G' adapted to register with corresponding apertures H' formed in the valve H, mounted to turn on top of the seat G. The upper face of the valve H is below the inlet D, as is plainly shown in Fig. 2, so that the fluid entering the said inlet D and passing into the upper part of the cylinder B, exerts a pressure on the said valve to hold the same on its seat G.

On the bottom of the valve H and in the center of the same, is arranged an offset $H^2$ fitting into a corresponding recess $G^2$ formed in the top of the seat G. The valve H is provided with a valve stem $H^3$ extending upward and passing out through suitable stuffing boxes in the cap of the valve body A. On the outer end of the valve stem $H^3$ is held a lever I for conveniently turning the said valve stem and consequently the valve H, so as to bring the openings H' of the latter into registry with the openings G' or to cut off the same as the case may be. In the valve stem $H^3$ is arranged a port $b$ which opens into the upper part of the cylinder B and extends through the valve H and the offset $H^2$, to connect with the bottom of the recess $G^2$ for counterbalancing the said valve H as hereinafter more fully described.

In the cylinder C is an arrangement similar to that of the cylinder B, and for this purpose the said cylinder is provided, near its lower end, with a circular offset C' on which is fitted a valve seat J provided with openings J' and a recess $J^2$. On the top of the seat J is a valve K also provided with apertures K' adapted to register with the apertures J' of the seat J. An offset $K^2$ on the bottom of the said valve K fits into the recess $J^2$, and the valve stem $K^3$ of the valve K also extends upward and passes through stuffing boxes in the cap of the valve body A. On the outer end of this valve stem K³ is arranged an arm L engaged at its free end by a fork I' formed on the lever I. In the valve stem K³ and extending through the valve K is arranged a port c leading from the upper end of the cylinder C to the bottom of the recess J² and serving to counterbalance the valve K as hereinafter more fully described.

The operation is as follows: When the lever I is in a central position, as illustrated in Fig. 1, then the apertures H' in the valve H are disconnected from the apertures G' in the seat G, and in a like manner the apertures K' in the valve K are disconnected from the apertures J' in the seat J. When the lever I is moved in the direction of the arrow a' into the position shown in Fig. 1, then the two valves H and K are actuated simultaneously in such a manner that the openings H' in the valve H register with the openings G' in the seat G. At the same time the openings K' in the valve K do not register with the openings J' in the seat J, so that the exhaust F remains closed. The fluid under pressure entering the inlet D, passes into the upper end of the cylinder B and through the registering openings H' and G' into the lower part of the cylinder B, and from the latter through the channel a into the upper end of the cylinder C and through the outlet E to the machinery to be actuated. When the lever I is moved from its central position shown in Fig. 1 in the inverse direction of the arrow a', then the valves H and K are turned so that the openings H' in the valve H are disconnected from the openings G' and the pressure is cut off from the lower part of the cylinder B and altogether from the cylinder C. At the same time the openings K' in the valve K register with the openings J' in the seat J, so that the exhaust F is opened and consequently communication is established between the machinery to be actuated, the outlet E, the cylinder C, apertures K' and J', the lower part of the cylinder C, and exhaust F. Now, it will be seen that when the pressure is applied as above described, the pressure is always on top of the valves H and K, so that all wear is automatically taken up as the pressure exerted against the said valves from above holds the said valves on their seats G and J. When the pressure is cut off and the exhaust takes place, as above described, then the pressure of the exhaust is on the top of the valve K so that the latter is held on its seat, both when pressure is applied and when the exhaust takes place, as above described. In case the seats and valves G, J and H, K become completely worn out they can be conveniently removed and replaced by simply taking off the cap of the valve body A and removing the said seats and valves from the cylinders B and C. By using the ports b and c, the fluid under pressure can pass to the under side of part of the valves H and K, so as to counterbalance a part only of the heavy downward pressure on the top of the valves as otherwise the valves would be pressed on their seats with such force as to render the moving of the valves very difficult. Thus it will be seen that the valves are not liable to leak as the pump pressure is always on top of the admission valve H and either the pump pressure or the exhaust pressure is always on top of the exit valve K, thus holding both constantly down on their seats G and J, and the more the latter become worn the tighter becomes the joint.

The machinery to be actuated will stand motionless at any desired position without the expenditure of any additional hydraulic pressure usually necessary on account of leakage in the valves.

As no gaskets, packing rings of soft material, or other like devices are employed in this valve, no danger is experienced from pieces of such soft material passing into the hydraulic pipes.

It will further be seen that no especial adjustment or attention is necessary on the valve until the valves proper H, K and their seats, are completely worn out, and no skilled labor whatever is necessary to take care of the valve.

I do not limit myself to any special construction of valve, as the same may be varied according to the intended use. The seats G and J may be any desired shape and rigidly secured in the cylinders or directly formed therein if desired. The valve may also be used to great advantage on steam engines, blast engines, and other machinery.

Having thus fully described my invention, I claim as new and desire to secure by Letters Patent,—

1. In a device of the class described, a valve body provided with an inlet and outlet and an exhaust, apertured valve seats arranged between the said inlet, outlet and exhaust and apertured valves mounted to turn on the said seats and arranged in such a manner that when one opens the other closes, substantially as shown and described.

2. In a hydraulic valve, the combination with a valve body having connected cylinders provided with an inlet and outlet and an exhaust, of two apertured valve seats of which one is located between the said inlet and outlet and the other between the outlet and the exhaust, and apertured valves mounted to turn on the said valve seats and arranged in such a manner that when one opens the other closes, substantially as shown and described.

3. In a hydraulic valve, the combination with a valve body having an inlet and an outlet cylinder arranged alongside each other, and of which the inlet cylinder is connected at its bottom by a channel with the top of the outlet cylinder, the said inlet cylinder being provided near its upper end with an inlet, and the outlet cylinder being provided at its upper end with an outlet leading to the machinery to be actuated and also provided, at its bottom, with an exhaust, of apertured seats held in the said cylinders near their lower ends, and valves mounted to turn on the said seats and provided with apertures to register with the apertures in the said seats, substantially as shown and described.

4. In a hydraulic valve, the combination with a valve body having an inlet and an outlet cylinder arranged alongside each other, and of which the inlet cylinder is connected at its bottom by a channel with the top of the outlet cylinder, the said inlet cylinder being provided near its upper end with an inlet and the outlet cylinder being provided at its upper end with an outlet leading to the machinery to be actuated and also provided, at its bottom, with an exhaust, of apertured seats held in the said cylinders near their lower ends, valves mounted to turn on the said seats and provided with apertures adapted to register with the apertures in the said seats, a lever held on the outer end of the stem of the pressure valve in the inlet cylinder, and an arm secured on the stem of the valve in the outlet cylinder, the free end of the said arm being engaged by the said lever, substantially as shown and described.

JOHN W. CABOT.

Witnesses:
 WALTER L. BOUVÉ,
 F. ROCKWOOD HALL.